Patented Jan. 30, 1940

2,188,439

UNITED STATES PATENT OFFICE 2,188,439

PROCESS FOR THE REMOVAL OF FOREIGN PARTICLES FROM GASES

George M. Kirkpatrick, Pittsburgh, Pa., assignor to Blaw-Knox Company, Pittsburgh, Pa., a corporation of New Jersey No Drawing. Application June 30, 1938,
Serial No. 216,847

6 Claims. (Cl. 252—1)

This invention relates to an improved process for the removal of foreign particles from gas. Gas used for industrial purposes, for example, natural or artificial fuel gas, often contains solid matter in the form of dust, fine droplets or spray, which it is desirable to remove at some point or another in the distribution system. This removal may be accomplished largely or entirely by "contacting" the gas with a liquid, which liquid serves to entrain or dissolve the solid matter in the gas. Various contacting devices are in use. The most effective of them achieve an intimate contact between the liquid and the gas by forming the liquid into a spray or rain through which the gas passes. Such a contactor is shown in Sillers Patent 2,048,145, dated July 21, 1936.

The contacting liquid heretofore employed has generally been a mineral oil, although other liquids have been proposed. The liquids heretofore used have not been entirely satisfactory, either because of the absence of desired physical properties, or because of expense. A notable shortcoming of contactor fluids heretofore employed is so-called "carry-over". By this is meant the inclusion in the stream of gas as it issues from the contacting apparatus of a portion of the contact liquid either because it has been volatilized or because it has been reduced to a fine mist or fog which cannot be recovered in apparatus of economical size. The carry-over naturally results in a depletion of the normal supply of liquid available for cleaning purposes, this requiring continuous or frequent supply of additional cleaning liquid. This is most unsatisfactory because in many cases it is desirable that the periods between replenishments of liquid in a contactor be very long, sometimes an entire year. It is also unsatisfactory because the liquid used is relatively expensive and its depletion adds to the final cost of the gas supply. Other disadvantages of carry-over are that the fog ultimately condenses into liquid or viscous matter in the pipe lines and fixtures beyond the contact apparatus, and also, in certain cases, may have an injurious effect upon the use to which the gas may be put.

I have discovered that these shortcomings may be cured, and a contact liquid of superior character and performance may be obtained, by using a mixture of liquids so as to produce a compound fluid having certain physical properties. I employ at least two liquids, each of which is relatively non-volatile at ordinary temperatures. However, the liquids employed have widely differing viscosity and they are mixed in suitable proportions to obtain a low viscosity, of the order of 30 to 60 seconds Saybolt at 100° F. The following examples are illustrative of my invention.

*Example 1.*—A commercial mineral lubricating oil and dibutyl phthalate were mixed in the proportion of 80% of oil to 20% of dibutyl phthalate. The oil had a viscosity of 240 seconds Saybolt at 130° F. This viscosity did not increase excessively as the temperature was lowered. The oil had a flash point of 600° F. The dibutyl phthalate had a viscosity of 8 seconds Saybolt at 100° F., a flash point of 168° C., a volatility of 3.74% in six hours at 100° C., and a vapor pressure of .25 mm. of mercury at 180° C.

The oil and the dibutyl phthalate are miscible in all proportions from zero to about 30% of dibutyl phthalate by volume. The addition of the dibutyl phthalate lowers the viscosity of the mix. The proportions may be varied under different circumstances, but the percentage stated has been found to give an excellent mixture which functions satisfactory and is not unduly costly. The mixture has a viscosity between 30 and 50 seconds Saybolt at 100° F. It does not volatilize nor fog in a Sillers contactor at ordinary atmospheric temperatures, and may be readily reduced to the form of a spray or rain.

It is not necessary to use purified dibutyl phthalate as it is ordinarily supplied to the market. The final purifying steps usually taken may be omitted, resulting in a materially lower cost.

*Example 2.*—The contacting liquid used in Example 1 may be improved by the addition of a "wetting agent" such as octyl alcohol. The function of the wetting agent is to enable solid particles entrained in the gas to more readily penetrate the surface film of the droplets. The vapor pressure of octyl alcohol is .28 mm. at 20° C. From ½ to 1% of this wetting agent, when added to the fluid of Example 1, materially improved the capacity of the fluid to remove solid particles from suspension in fuel gases and did not appreciably otherwise affect the physical properties of the fluid.

*Example 3.*—Castor oil in the proportion of 60% or less was mixed with dibutyl phthalate in the proportion of 40% or more. The lower quantity of dibutyl phthalate was preferred because of cost. The castor oil was highly viscous and non-volatile, having a flash point of 235° C. and an ignition point of 423.4° C.

It will be noted from the above examples that various oils may be employed. With mineral oils dibutyl phthalate may be successfully used in the amount of 10 to 30%. If the oil is relatively non-viscous or what is known as a "light" oil, the amount of dibutyl phthalate employed may be reduced. The octyl alcohol referred to in Example 2 gives useful results in the range of from ½ to 1%.

In place of dibutyl phthalate, other liquids commonly described as esters or as plasticisers, because of uses to which they are sometimes put, may be substituted. Among these may be mentioned tricresylphosphate, triacetin, diamyl phthalate, diethyl phthalate, dibutyltartrate, triphenyl phosphate, octyl acetate, Carbitol acetate. Carbitol acetate is a trade name for diethylene glycol mono-ethyl ether acetate. These are variously misicible with mineral lubricating oils, some forming emulsions instead of true solutions, and some requiring catalysers to produce miscibility. As the present time, however, because of price, dibutyl phthalate is preferred. This particular liquid, moreover, has the advantage of readily absorbing tar and asphalt which is an advantage in treating certain fuel gases.

My improved process has many advantages. The fluid is not volatile in any substantial degree over the temperature range required, which will generally be from some degrees below zero to about 130° F. It is readily reducible to a spray composed of small drops, but it does not become so finely divided as to produce a fog or a mist. It retains this property over the required temperature range. Its surface tension is low and particles suspended in the gas undergoing treatment readily penetrate the surface of the droplets with which they come in contact and are thereby transferred from suspension in the gas to inclusion in the liquid. As stated, this property may be enhanced by the addition of a wetting agent. The liquid does not react chemically with the gas under treatment.

In certain instances it may be desired to add a constituent to the gas and this can be done by mixing such constituent with my improved liquid. Needless to say, if such procedure is followed there will be a depletion of the liquid or at least of the constituent which it is desired to add to the gas.

While I have described certain preferred embodiments of the invention, it will be understood that these are by way of example only and that the invention may be otherwise practiced or embodied within the scope of the following claims.

I claim:

1. A process for the removal of foreign particles from gases which comprises bringing the particle laden gas to be treated into intimate contact at temperatures within the normal atmospheric range with a fluid consisting essentially of a mixture of two liquids, each relatively non-volatile at ordinary temperatures but of different viscosity, the mixture being substantially non-volatile below 130° F. and having a viscosity of the order of 30 to 60 seconds Saybolt at 100° F.

2. A process for the removal of foreign particles from gases which comprises bringing the particle laden gas to be treated into intimate contact at temperatures within the normal atmospheric range with a fluid consisting essentially of a mixture of an oil and a viscosity modifier of the group dibutyl phthalate, diamyl phthalate, diethyl phthalate, dibutyltartrate, triphenyl phosphate, octyl acetate, "Carbitol" acetate, the mixture being substantially non-volatile below 130° F. and having a viscosity of the order of 30 to 60 seconds Saybolt at 100° F.

3. A fluid for the removal of foreign particles from gases consisting essentially of a mixture of oil and dibutyl phthalate, the mixture being substantially non-volatile below 130° F. and having a viscosity of the order of 30 to 60 seconds Saybolt at 100° F.

4. A fluid for the removal of foreign particles from gases consisting essentially of a mixture of a mineral oil and dibutyl phthalate, the dibutyl phthalate being present in the amount of approximately 20%, the mixture being substantially non-volatile below 130° F. and having a viscosity of the order of 30 to 60 seconds Saybolt at 100° F.

5. A fluid for the removal of foreign particles from gases consisting essentially of a mixture of two liquids, each relatively non-volatile at ordinary temperatures but of different viscosity, the mixture being substantially non-volatile below 130° F. and having a viscosity of the order of 30 to 60 seconds Saybolt at 100° F., and a wetting agent.

6. A fluid for the removal of foreign particles from gases consisting essentially of a mixture of two liquids, each relatively non-volatile at ordinary temperatures but of different viscosity, the mixture being substantially non-volatile below 130° F. and having a viscosity of the order of 30 to 60 seconds Saybolt at 100° F., and octyl alcohol.

GEORGE M. KIRKPATRICK.